(12) United States Patent
Mundhenk et al.

(10) Patent No.: US 8,928,815 B1
(45) Date of Patent: Jan. 6, 2015

(54) SYSTEM AND METHOD FOR OUTDOOR SCENE CHANGE DETECTION

(71) Applicant: HRL Laboratories, LLC, Malibu, CA (US)

(72) Inventors: Terrell N. Mundhenk, Calabasas, CA (US); A. Arturo Flores, La Jolla, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/205,362

(22) Filed: Mar. 11, 2014

Related U.S. Application Data

(60) Provisional application No. 61/780,561, filed on Mar. 13, 2013.

(51) Int. Cl.
*H04N 9/64* (2006.01)
*H04N 5/14* (2006.01)
*H04N 11/20* (2006.01)

(52) U.S. Cl.
CPC ............... *H04N 5/147* (2013.01); *H04N 11/20* (2013.01)
USPC ..................... 348/700; 348/650; 375/240.01

(58) Field of Classification Search
USPC .......... 348/453, 650, 700–702; 382/164, 171; 375/240.01, 240.12, 240.16
IPC ....................................... H04N 9/64,11/20, 5/14
See application file for complete search history.

(56) References Cited

U.S. PATENT DOCUMENTS

| 7,899,253 | B2 | 3/2011 | Porikli et al. | |
|---|---|---|---|---|
| 8,165,407 | B1 | 4/2012 | Khosla et al. | |
| 8,243,991 | B2 | 8/2012 | Das et al. | |
| 8,639,042 | B2 | 1/2014 | Liu et al. | |
| 8,649,606 | B2 | 2/2014 | Zhao et al. | |
| 2003/0053538 | A1* | 3/2003 | Katsavounidis et al. | 348/700 |
| 2005/0123044 | A1* | 6/2005 | Katsavounidis et al. | 348/700 |
| 2008/0063285 | A1 | 3/2008 | Porikli et al. | |
| 2008/0129875 | A1* | 6/2008 | Lei et al. | 348/700 |
| 2010/0092036 | A1 | 4/2010 | Das et al. | |
| 2011/0229025 | A1 | 9/2011 | Zhao et al. | |
| 2011/0311137 | A1 | 12/2011 | Liu et al. | |

OTHER PUBLICATIONS

Bruhn, A., Weickert, J., Feddern, C., Kohlberger, T., & Schnorr, C. (2005). Variational optical flow computation in real time IEEE Transactions on Image Processing, 14(5), 608-615.

(Continued)

*Primary Examiner* — Sherrie Hsia
(74) *Attorney, Agent, or Firm* — Tope-McKay & Associates (57) ABSTRACT

Described is a system for scene change detection. The system receives an input image (current frame) from a video stream. The input image is color conditioned to generate a color conditioned image. A sliding window is used to segment the input image into a plurality boxes. Descriptors are extracted from each box of the color conditioned image. Thereafter, differences in the descriptors are identified between a current frame and past frames. The differences are attenuated to generate a descriptor attenuation factor $\alpha_i$. Initial scores are generated for each box based on the descriptor attenuation factor $\alpha_i$. The initial scores are filtered to generate a set of conspicuity scores for each box, the set of conspicuity scores being reflective of the conspicuity of each box in the image. Finally, the conspicuity scores are presented to the user or provided to other systems for further processing.

24 Claims, 8 Drawing Sheets
(5 of 8 Drawing Sheet(s) Filed in Color)

(56) References Cited

OTHER PUBLICATIONS

Dalal, N., & Triggs, B. (2005). Histograms of Oriented Gradients for Human Detection. Paper presented at the CVPR, San Diego, CA.

Dalal N., & Triggs, B., & Schmid. C. (2006). Human Detection using Oriented Histograms of Flow and Appearance. Paper presented at the European Conference on Computer Vision (ECCV '06).

Itti, L., & Baldi, P. (2005). A principled approach to detecting surprising events in video. Paper presented at the Proc. IEEE Conference on Computer Vision and Pattern Recognition (CVPR).

Itti, L., & Baldi, P. (2006). Bayesian Surprise attracts human attention. Paper presented at the Advances in Neural Information Processing Systems (NIPS).

Itti, L., Koch, C., & Braun, J. (2000). Revisiting Spatial Vision. Towards a Unifying Model. JOSA-A, 17(11), 1899-1917.

Kullback, S., & Leibler, R. A. (1951). On information and sufficiency. Annals of Mathematical Statistics. 22, 79-86.

Vedaldi, A., & Fulkerson, B. (2008). VLFeat: An Open and Portable Library of Computer Vision Algorithms.

* cited by examiner

| Subset | Symbol | Parameter | Value |
|---|---|---|---|
| Color Condition | V | Unified Value | 50 |
| HOG Descriptors | | Win Size | 64x128 |
| HOG Descriptors | | Win Stride | (31,31) |
| HOG Descriptors | | Block Size | 8x8 |
| HOG Descriptors | | Cell Size | 8x8 |
| HOG Descriptors | | Scale | 1.05 |
| HOG Descriptors | | Gamma Corr | 1 |
| HOG Descriptors | | nlevel | default_nlevels |
| HOG Descriptors | | num bins | 9 |
| Descriptor Process | Wa | Inhibit Weight | 10 |
| DoG Filter | G1 (Rows) | Sigma 1, Rows | 0.75*(win_size/(2*win_stride)) |
| DoG Filter | G2 (Rows) | Sigma 2, Rows | G1 (Rows) * 0.25 |
| DoG Filter | G1 (Columns) | Sigma 1, Columns | G1 (Rows) * 2.0 |
| DoG Filter | G2 (Columns) | Sigma 2, Columns | G1 (Columns) * 0.25 |
| Surprise | $\lambda$ | Surprise Update | 0.9 |
| Surprise | Ws | Surprise Enhance | 0.5 |

SYSTEM AND METHOD FOR OUTDOOR SCENE CHANGE DETECTION

GOVERNMENT RIGHTS

This invention was made with government support under U.S. Government Contract Number PO 154318, the REF ASPS Program. The government has certain rights in the invention.

CROSS-REFERENCE TO RELATED APPLICATIONS

This is a non-provisional patent application of U.S. Provisional Application No. 61/780,561, filed on Mar. 13, 2013, and entitled, "Device for outdoor scene change detection from conspicuity of histogram of oriented gradient based features with adaptive Bayesian."

FIELD OF INVENTION

The present invention relates to an object detection system and, more particularly, to a scene change detection system that identifies regions of interest in an input frame while reducing the effect of motion noise.

BACKGROUND OF INVENTION

The present invention is directed to a scene change detection system which can be used for object detection. Scene change detection is often referred to as motion conspicuity detection. While motion conspicuity detectors exist, they each have their drawbacks. Examples of such motion conspicuity detectors include variational optical flow, biological saliency, and standalone bayesian surprise. Variational optical flow was described by Bruhn, A., Weickert, J., Feddern, C., Kohlberger, T., and Schnorr, C., in "Variational optical flow computation in real time", IEEE Transactions on Image Processing, 14(5), 608-615 (2005). Biological saliency was described by Itti, L., Koch, C., and Braun, J., in "Revisiting Spatial Vision", Towards a Unifying Model. JOSA-A, 17(11), 1899-1917 (2000), while Standalone Bayesian Surprise was described by Itti, L., and Baldi, P. in "A principled approach to detecting surprising events in video", Paper presented at the Proc. IEEE Conference on Computer Vision and Pattern Recognition (CVPR) (2005), and "Bayesian Surprise attracts human attention", Paper presented at the Advances in Neural Information Processing Systems (NIPS) (2006). Each of the aforementioned conspicuity detectors, in of themselves, are incomplete for scene change detection. Further, they are subject to the effects of motion noise which dramatically decreases their efficacy.

Thus, a continuing need exists for a system that identifies regions of interest in an input frame while reducing the effect of motion noise.

SUMMARY OF INVENTION

Described is a system, method, and computer program product for outdoor scene change detection. The system, for example, includes one or more processors and a memory. The memory is a non-transitory computer-readable medium having executable instructions encoded thereon, such that upon execution of the instructions, the one or more processors performs several operations, such as receiving an input image from a video stream, the input image being a current frame in the video stream; color conditioning the input image to generate a color conditioned image; using a window to segment the input image into a plurality boxes; extracting descriptors from each box of the color conditioned image; identifying differences in the descriptors between a current frame and past frames; attenuating the differences to generate a descriptor attenuation factor $\alpha_i$; generating initial scores for each box based on the descriptor attenuation factor $\alpha_i$; filtering the initial scores to generate a set of conspicuity scores for each box, the set of conspicuity scores being reflective of a conspicuity of each box in the image; and presenting to a user or providing for further processing the boxes having conspicuity scores that exceed a predetermined threshold.

In another aspect, the system performs an operation of down-sampling the color conditioned image.

In yet another aspect, color conditioning the input image further comprises operations of converting the input frame, which is in a red-green-blue (RGB) color space, to a standard hue-saturation-value (HSV) color space; setting all the pixels in the input frame to have the same constant intensity V; and transforming the input frame back into the RGB color space to generate a color conditioned image.

Additionally, in extracting descriptors from each box of the color conditioned image, a set of descriptors $h_{ij}$ are obtained from each box j, where h denotes a type of descriptor, such that $h_{ij}$ is the ith descriptor in the descriptor set j.

In another aspect, identifying differences in the descriptors between a current frame and past frames further comprises operations of generating a difference descriptor $d_{ij}$ for the ith descriptor in box j at the current time t going back f number of frames as follows:

$$d_{ij} = \max[(h_{ij}^t - h_{ij}^{t-1}), \ldots, (h_{ij}^t - h_{ij}^{t-f})];$$

and generating a mean difference descriptor d, that contains a mean difference for each descriptor i over all j descriptor set boxes, as follows:

$$\bar{d}_t = \frac{\sum_{j=1}^{n} d_{ij}}{n} \cdot 100.0,$$

where there are n descriptor sets.

Additionally, the descriptor attenuation factor $\alpha_i$ is generated according to the following:

$$\alpha_i = (1 - \bar{d}_t)^{w_\alpha},$$

where $w_\alpha$ is a constant weight.

Further, in generating initial scores $p_j$ for each box j based on the descriptor attenuation factor, the initial score is a score p, for each box j, for n descriptors in each box j, such that the initial score $p_j$ is determined according to the following:

$$p_j = \sqrt{\frac{\sum_{i=1}^{m} d_{ij} \cdot a_i}{\sum_{i=1}^{m} a_i}}.$$

In yet another aspect, in filtering the initial scores, the scores are filtered consecutively through a Difference of Gaussian (DoG) filter, a Bayesian Surprise attenuation filter, and a score range conditioning filter, resulting the set of conspicuity scores for each box.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

The present invention relates to an object detection system and, more particularly, to a scene change detection system that identifies regions of interest in an input frame while reducing the effect of motion noise. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is scene change detection system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
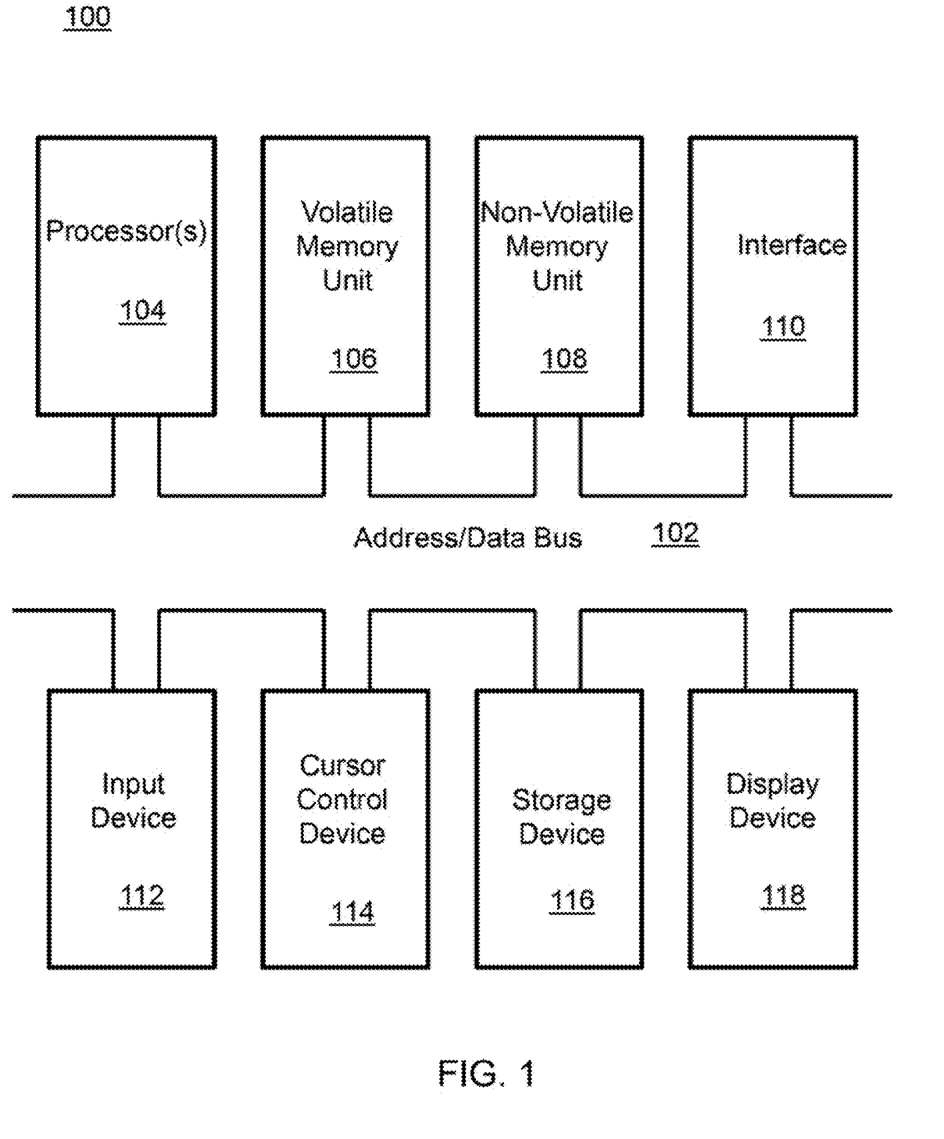
FIG. 1 is a block diagram depicting the components of a scene change detection system according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g. software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
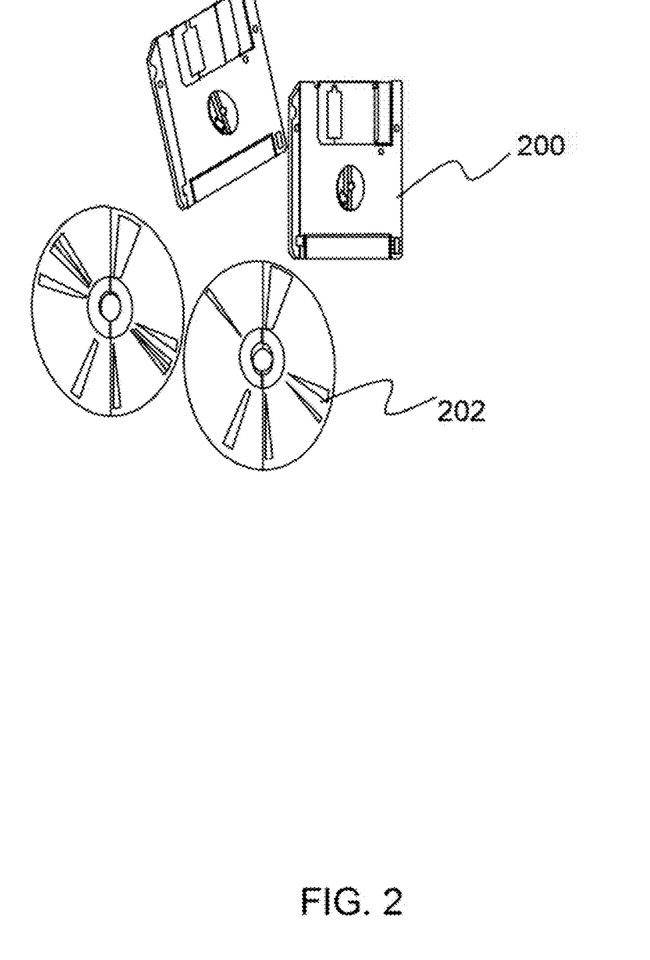
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

The present invention is directed to a scene change detection system. The system is operable for detecting conspicuous objects in a video (such as persons, etc.) in a natural scene using motion, while ignoring other types of motion that are less interesting, such as blowing vegetation. The system is also designed to return a useful score of conspicuity which can be used to detect a pedestrian on its own. This last item is useful if pedestrians are heavily blurred and cannot be identified by standard pedestrian detectors. Further, the scores can be used to enhance an object (e.g., pedestrian) identification program (such as a HOG detector or similar pedestrian detector). The system is well suited for surveillance systems, object detection systems and vision-based manufacturing.

In operation, the system looks for conspicuous changes in frames of video for the purpose of localizing possible human targets in an outdoor scene. The exact extent of the object of change is of less concern then its general location. That is, it does not necessarily return the shape of the object which is spotted, but rather it returns its location and approximate size. Additionally, a score is assigned to all locations of conspicuity. The score provides an indication as to how conspicuous the target is. Once the system is run, a set of scores is returned over the extent of the image for each frame. This can then be used to limit the region of interest for an object identification algorithm, such as a pedestrian identification algorithm that utilizes Histogram of Oriented Gradient (HOG) detector or related methods. The system can also be used to outright detect pedestrians in videos with poor quality where a HOG detector does not function well.

Figure 3A:
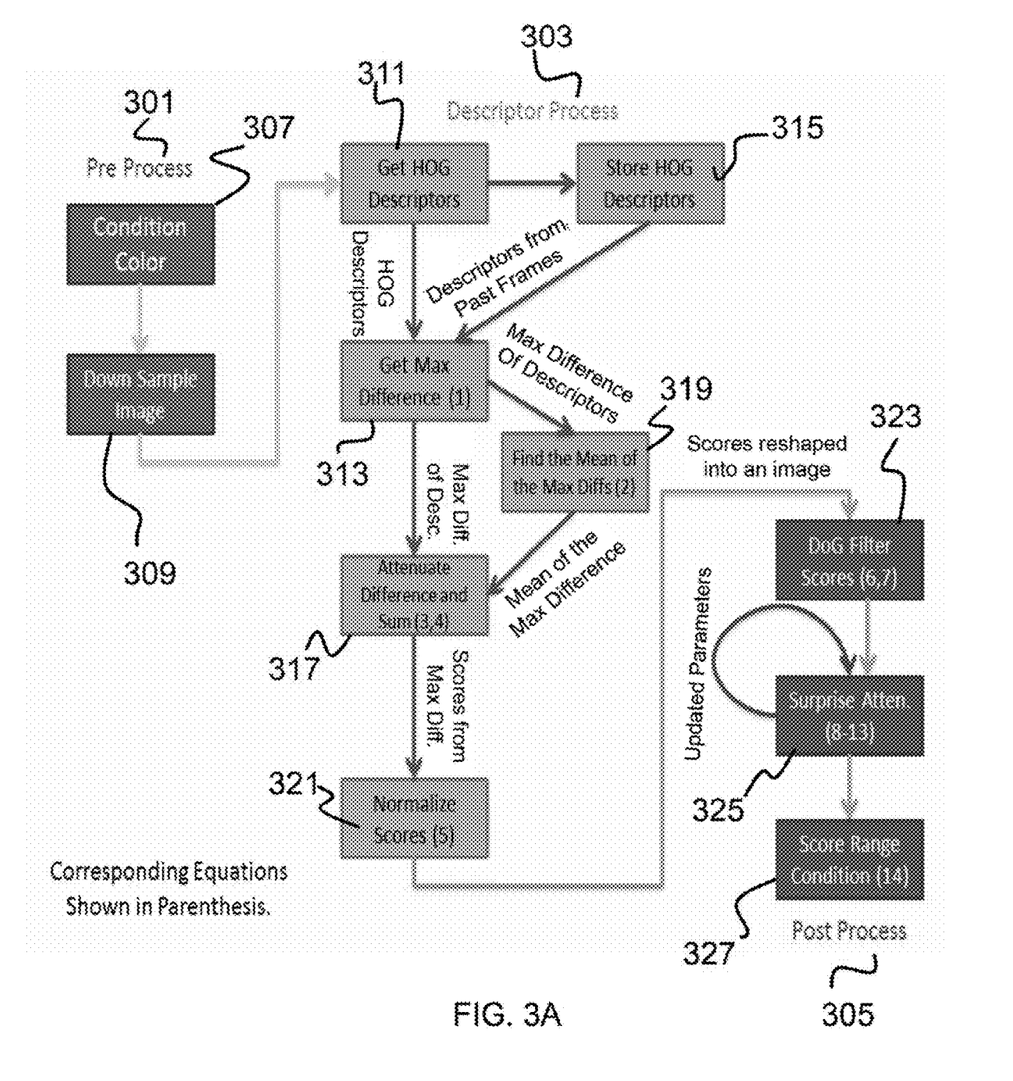
FIG. 3A is a flow chart depicting a process for scene change detection according to the principles of the present invention.

For further understanding and as illustrated in FIG. 3A, the invention is described with respect to three primary steps: (1) pre-process 301, (2) descriptor-process 303 and (3) post-process 305. In the pre-process 301 stage, each frames' colors are conditioned 307 to improve performance under luminance changes, then it is down sampled 309 to make it smaller so processing goes faster. In the descriptor-process 303, HOG style descriptors are extracted 311 from a frame and processed to find differences 313 from past frames (from stored HOG descriptors 315). These differences 313 are then attenuated 317 (using a mean of the maximum differences 319) to weaken common differences which would be things like blowing bushes. The attenuated difference 317 of descriptors will form the basis of the scores 321. In the post-process 305, the scores are filtered to remove certain types of common noise and undesired effects. The end result after all three stages is a set of scores around an image giving the conspicuity of the locations in the image.

Figure 3B:
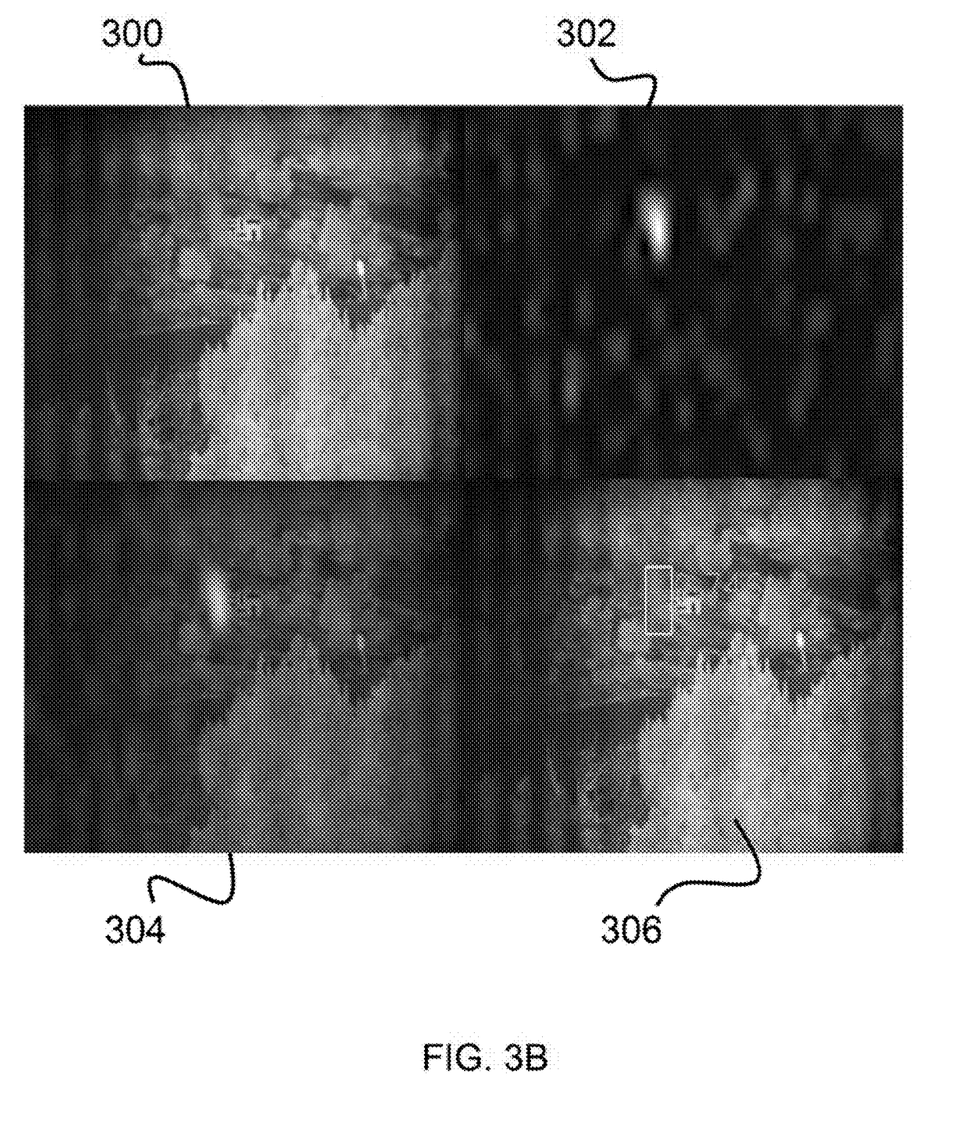
FIG. 3B is an illustration depicting the fifth frame from a five frame burst sequent and corresponding score results according to the principles of the present invention.

The process is further illustrated in FIG. 3B. FIG. 3B depicts the fifth frame from a five frame burst sequent and score results. The top left image is the input image 300 frame. A blurry person can be seen next to the geometric sign in the middle. The top right shows the final scores image 302 created by the system. Note that the scores image 302 created is actually very small, so here it has been rescaled to the size of the original input image 302. The bottom left shows the overlap 304 of the scores image 302 with the input image 300. The person has been well detected. The last image at the bottom right is the detection 306 made from thresholding the scores (per equation 14, as described below). The score it derived at that location is shown in green next to the detection box. Thus, as can be appreciated by those skilled in the art, the score can be used to verify the presence of an item of interest, a non-limiting example of which includes a pedestrian. The present invention is described in further detail below.

(3) Specific Details of the Invention

As noted above, the system generally operates according to three steps: (1) pre-process, (2) descriptor-process and (3) post-process. Each of these steps is described in turn below.

(3.1) Pre-Process

Each frame of video is pre-processed. Referring again to FIG. 3A, the pre-process 301 step is independent of any other frame that came before it. Thus, all frames undergo the exact same pre-process. There are two steps in the pre-process 301, coloring conditioning 307 and down-sampling of the image 309, with the first step being most critical.

Figure 4:
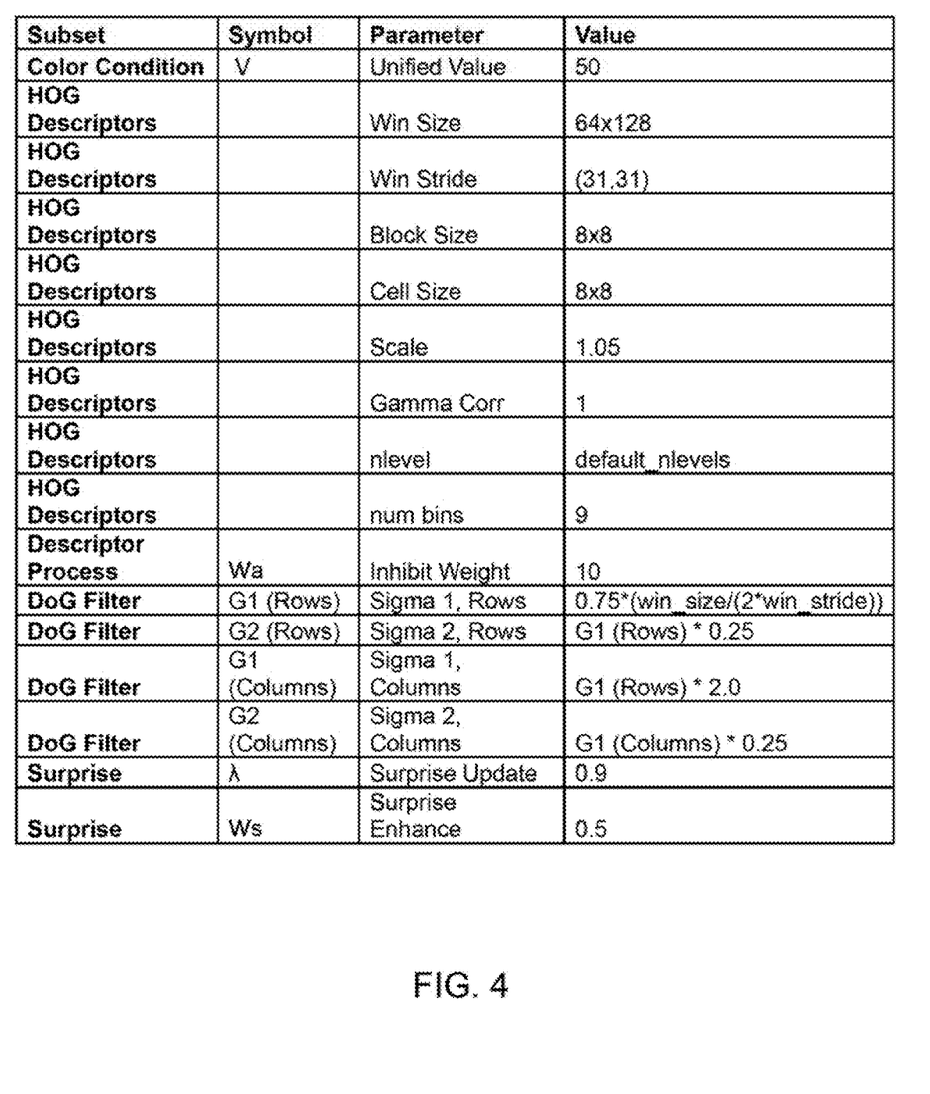
FIG. 4 is a table illustrating example parameters and values associated with the processes and filters according to the principles of the present invention.

In color conditioning 307, the input frame will have its intensity set homogeneously to the exact same value. This is done by converting the image to standard hue-saturation-value (HSV) color space and then setting all the pixels in the image to have the exact same constant intensity V (see the table provided in FIG. 4 for a value). The table depicted in FIG. 4 provides non-limiting examples of suitable parameter values. The table gives the parameter values used when testing the invention. Each column is given as follows. The subset labels what part of the invention the parameter belongs to, while the symbol is the mathematical symbol the value corresponds to. If this is blank, then the parameter is not described mathematically in this application with a corresponding testing example. Parameter gives the proper name of the parameter. Value is the actual parameter value used during testing. For HoG, for example, the values are provided for known parameters. Where there is a symbol provided, this relates an example value to one of the processes described herein. So for example, lambda in the table is the value in Equation (11) below.

Figure 5:
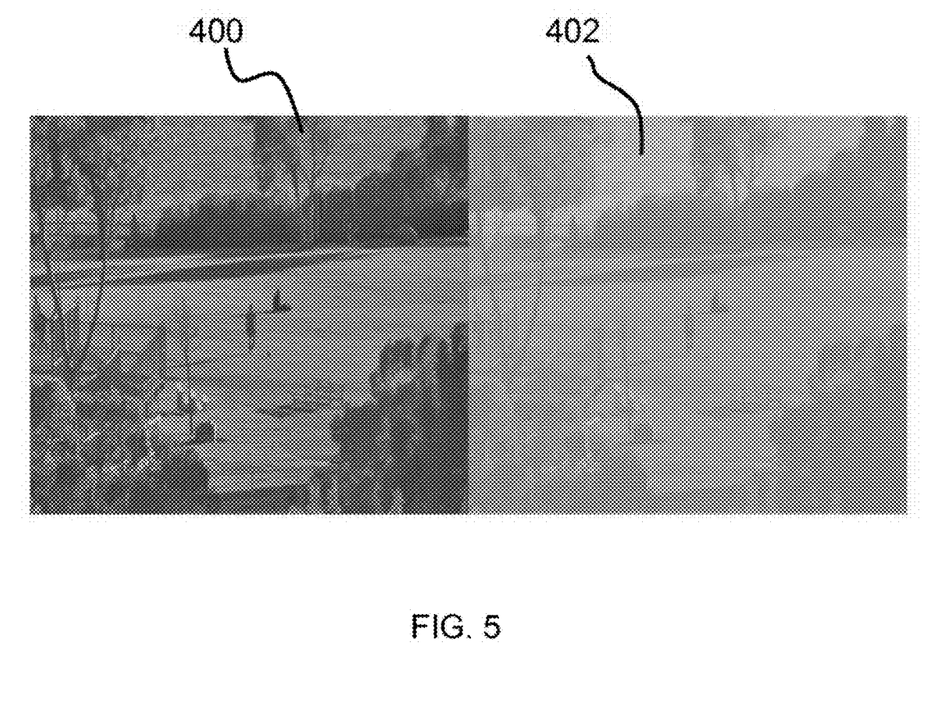
FIG. 5 is an illustration depicting two images, an input image and a color conditioned image.

Thereafter, the image is transformed back into red-green-blue (RGB) color space to generate a color conditioned image. The saturation S and hue value H are left alone. This has the effect of preserving the unique color quality of the video frame, but reducing intensity variation caused by shadow. An example of this is illustrated in FIG. 5, which depicts two images. The image on the left is the input image 500 to the color conditioner. The image on the right is the color conditioned image 502. While shadows and intensity can still be seen, they have been blunted, as shown. Although the conditioned image 502 is very odd to a human observer, it is ideal for many image processing programs.

Referring again to FIG. 3A, after the system has color conditioned 307 a frame (to generate a conditioned image), it is down sampled 309 to any suitable scale (e.g., 50%) using bicubic interpolation or any other suitable down-sampling technique.

(3.2) Descriptor-Process

The descriptor process 303 will take the pre-processed image, extract 311 descriptors and then find the conspicuous difference (reflected as a score 321) between descriptors in the current frame and past frames. The first step is to use a sliding window to extract 311 descriptors i at each location J. An example of a sliding window was described by Dalal, N., and Triggs, B. in their paper entitled, "*Histograms of Oriented Gradients for Human Detection*", which was presented in 2005 at the CVPR, San Diego, Calif., and which is hereby incorporated by reference as though fully set forth herein. As a non-limiting example, if the window is sized 64×128 pixels, the system will process the pixels inside that 64×128 box/window, then move it 31 pixels over and repeat the step. Every time this step is repeated, a new set of descriptors are obtained which describe the features inside that windowed area. This amounts to measuring things, such as how thick lines are and what angle the lines are positioned at. So in essence, for each box/window, a descriptor set is created which describes some features of the image within that 64×128 box. Since large steps can be taken by moving the box 31 pixels over every time (or any other suitable pixel movement), the actual number of descriptor sets is relatively low. For example, if the image has a width of 310 pixels, the system would only move the box 10 times for each row. If the image is 310×310 pixels, the system would create 100 total descriptor sets (per a step size of 31 pixels).

Each descriptor set (box) has several descriptors inside it. These are the properties of the image inside the 64×128 pixel box. There are several thousand descriptors inside each set. A descriptor can be denoted as $h_{ij}$. h is used to represent HOG, the type of descriptor being used. Also, this is the ith descriptor in the descriptor set j. That is, a new set j is created each time the system moves the box and extract 311 descriptors. Note that the system extracts the exact same number of descriptors for each box all the time.

Once the set of descriptors $h_{ij}$ are obtained from each box j, the system proceeds to find the difference between the set of descriptors in the current frame and the descriptors in past frames (It should be noted that a boxed area is a descriptor set for all the descriptors in that location. The terms "box" and "descriptor set" are conditionally interchangeable, in that "box" is used when trying to make it explicit that the set of features is at a location in the image within a boxed area (window)). While many differences may exist, it is desirable to identify the maximum difference 313. This is best explained with a thought exercise. Image you have drawn a 64×128 pixel box on a frame of video. A person is walking in the video and they start to walk through the 64×128 box. If you looked at the box at time t and at time t−1, you would see that the person has only moved a little bit. Thus, the descriptors have changed merely a little, but not a whole lot. However, if you compare the box at time t and time t−5, there is a much larger difference since you have gone back five frames. Thus, it is desirable to catch the larger change, which is done by finding the maximum difference 313 between the current frames descriptor set and several stored descriptor sets 315 from past frames. As such, a difference descriptor $d_{ij}$ is created for the ith descriptor in box (descriptor set) j at the current time t going back f number of frames (in the example above, f is 5 frames), as follows:

$$d_{ij} = \max[(h_{ij}^t - h_{ij}^{t-1}), \ldots, (h_{ij}^t - h_{ij}^{t-f})] \qquad (1)$$

The next step is to begin to transform this difference descriptor into a score. At the end of this process, a score 321 is generated for each 64×128 pixel box j that was used. The first transformation is to suppress very common differences. So, for instance, if there is a scene with lots of blowing grass, it is desirable to ignore the grass and look for the thing which is somewhat more unique (a person). Thus, it is desirable suppress the most common differences globally. To do this, a mean difference descriptor $\bar{d}_t$ 319 is created that contains the mean difference for each descriptor i over all j descriptor set boxes, as follows:

$$\bar{d}_t = \frac{\sum_{j=1}^{n} d_{ij}}{n} \cdot 100.0 \qquad (2)$$

In the above equation, there are n descriptor sets in all. Although not required, it is desirable to scale it by 100.0 (as done above in equation 2) so that the value of $\bar{d}_t$ will tend to range from 0 to 1. This value is then clamped so that it cannot be greater than 1, as follows:

$$\bar{d}_t = \begin{cases} 1 & \bar{d}_t > 1 \\ \bar{d}_t & \text{else} \end{cases} \qquad (3)$$

Thereafter, a descriptor attenuation factor $\alpha_i$ 317 is created which will be used to reduce the most common descriptor differences. The descriptor attenuation factor $\alpha_i$ 317 is created according to the following:

$$\alpha_i = (1 - \bar{d}_t)^{w_\alpha} \qquad (4)$$

Here $w_\alpha$ is a constant weight to bias attenuation towards the largest mean differences and somewhat ignore smaller mean differences (due to the weighting). Thereafter, the preliminary score 321 for each box $p_j$ is created. In other words, the preliminary score 321 is a score p, for each box j. Notably, the preliminary score 321 is further refined later in post-processing (as described in further detail below). For the m descriptors in each box, the $p_j$ is determined according to the following:

$$P_j = \sqrt{\frac{\sum_{i=1}^{m} d_{ij} \cdot a_i}{\sum_{i=1}^{m} a_i}} \qquad (5)$$

That is, the initial score 321 (normalized score) for a box is the sum of the attenuated differences between the descriptors in the current frame and a past frame (recall that this is the max difference).

(3.3) Post-Process

The post-process 305 is designed to eliminate various types of noise which can arise in the set of scores. There are three steps in the post process. These are: Difference of Gaussian (DoG) filtering 323, Bayesian Surprise attenuation 325 and score range conditioning 327.

Figure 6:
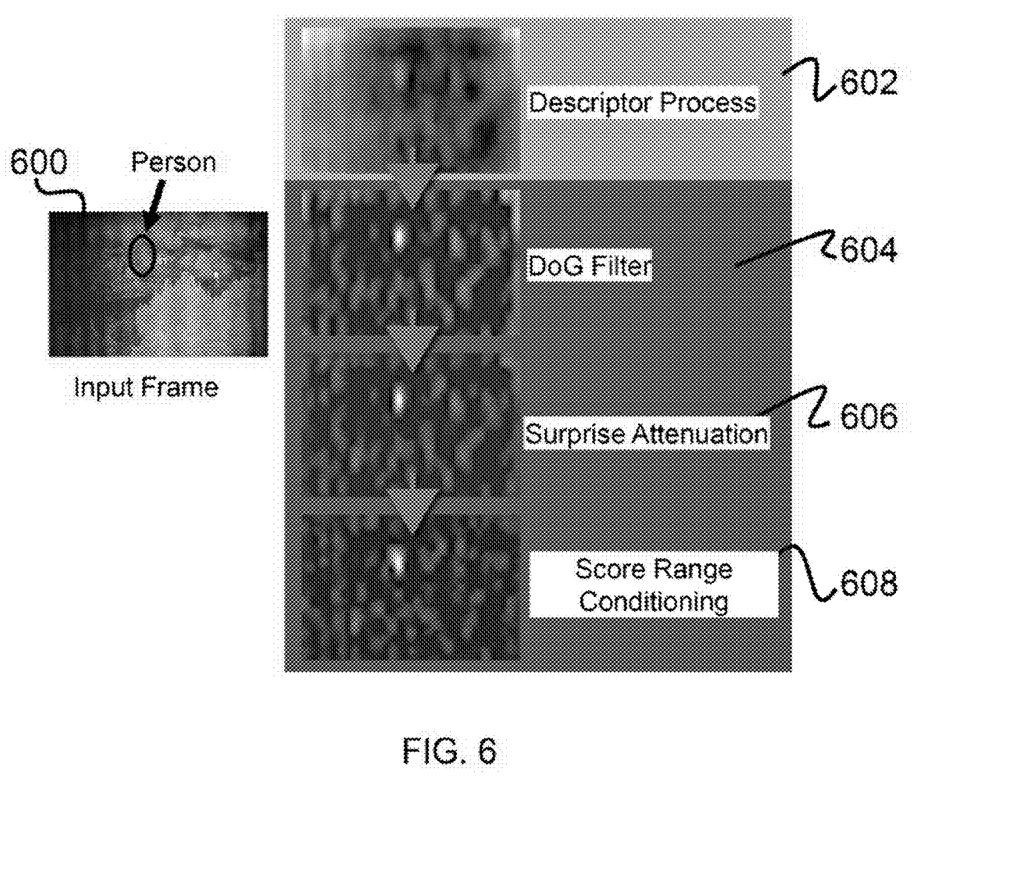
FIG. 6 is an illustration of the steps of post processing and their effects on the scores output, with each filter depicted as further reducing motion noise.

For further understanding, FIG. 6 provides an illustration of the steps of post processing and their effects on the scores output, with each filter depicted as further reducing the noise. Specifically, FIG. 6 illustrates the input frame 600, which progressively passes through the descriptor process 602, the DoG filter 604, the Surprise Attenuation Filter 606, and, finally, the Score Range Conditioning Filter 608. In this example, the DoG filter has the most salient effect. However, for some other sequences, the other filters may have stronger effects. Each of these filters are described in further detail below.

(3.3.1) Difference of Gaussian Filtering

The difference of Gaussian filter a two-dimensional (2D) image filter that tends to favor high frequencies and peaks in an image. In order to use it on the set of scores, the scores $p_j$ are arranged into an image. Arranging the scores $p_j$ into an image is accomplished as follows. For example, recall the 310×310 pixel image example. From this, 100 descriptor sets were extracted, one set from each 64×128 pixel box that was used. Thus, the 100 scores can be used and placed back into a 10×10 pixel image of scores (i.e., small scores image). Each score goes into the small scores image relative to where it would be in the original 310×310 pixel image. So, for instance, if a set of descriptors were extracted at location 31, 31 in the original image, the computed score would go in location 1,1 in the new small scores image.

Figure 7:
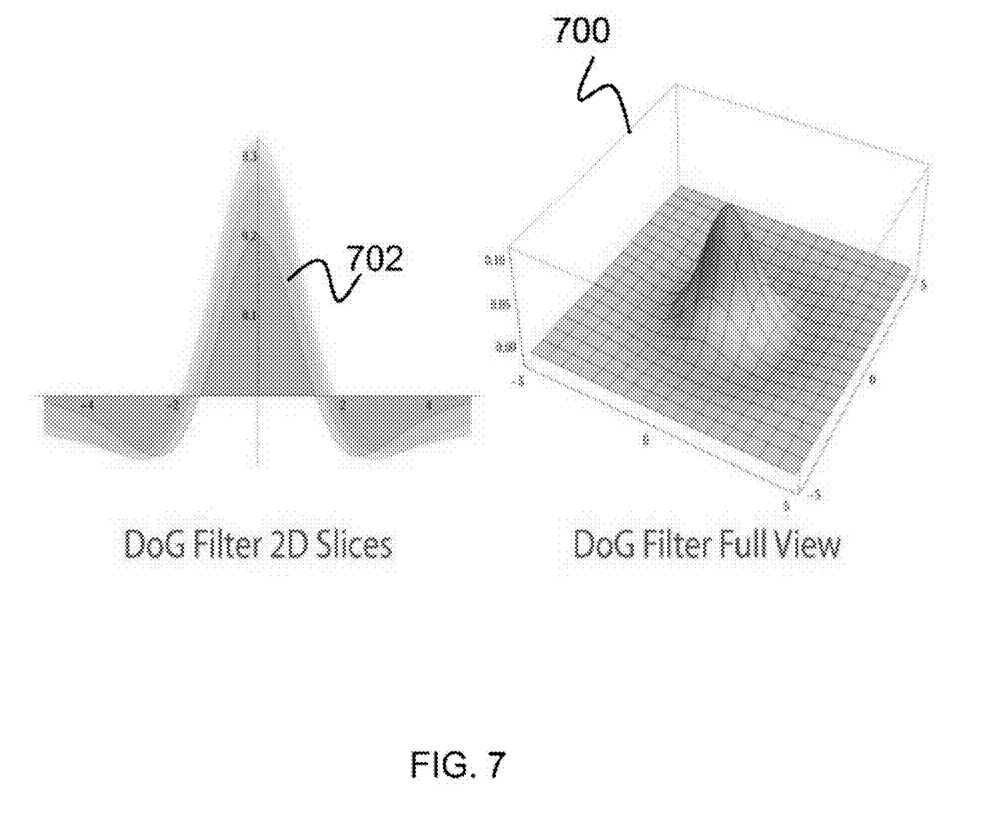
FIG. 7 is an illustration of an example of a DoG kernel, depicting a visual representation of a DoG full filter and a DoG filter as a 2D slice.

Once the small scores image has been generated, standard image filters can be applied to it. For example, it is desirable to create a DoG kernel K which is sized n×n and then convolve the small scores image P. An example of a DoG kernel can be seen in FIG. 7, which depicts a visual representation of a DoG full filter 700 and a DoG filter as a 2D slice 702. The x-axes, y-axes and z-axis in FIG. 7 represent image location x, image location y, and filter response, respectively. As can be understood by those skilled in the art, the center peak will tend to excite other pixels very close, but long range negative values will cause a general inhibition of pixels at medium range.

Given two Gaussian distributions $G_1$ and $G_2$ with $G_1$ having a smaller standard deviation, the DoG kernel K is derived as:

$$K = G_1 - G_2 \qquad (6)$$

Thereafter, the DoG filtered scores image via 2D convolution can be computed as:

$$S^g = P \otimes K \qquad (7)$$

Here, $S^g$ is the scores image processed by the DoG filter. It is the same size as the initial scores image P. An important note here is that the kernel K is oblong. Thus, in this non-limiting example, its height is 2 times its width. This is done to try and favor for pedestrians which also tend to be about 2 times taller than wide. See the parameter section of FIG. 4 for more details of this aspect. After DoG Filtering, the scores image is clamped to set any value less than zero to zero.

(3.3.2) Attenuation with Bayesian Surprise

Bayesian surprise is designed to remove noise and enhance scores which are more unique. For example, the larger and more sudden a score changes as compared to other scores, the more unique it is. In this case, it is designed to look for changes which are not noise. In this instance, the scores can be modelled over frames with a Gamma Probability Distribution Function (PDF), which is a function that is commonly known to those skilled in the art. See, for example, the definition as provided on Wikipedia (See http://en.wikipedia.org/wiki/Gamma_distribution, taken Feb. 11, 2014), which is hereby incorporated as though fully set forth herein. The probability function is related to the probability of waiting a certain interval for an event to reoccur after it has been observed. It is ideal for dealing with shot noise which has a randomized distribution of wait times. It is also naturally one tailed so it fits well to temporal distributions. More information regarding Bayesian Surprise can be found in papers by Itti, L., & Baldi, P., entitled, "*A principled approach to detecting surprising events in video*", which is a paper presented at the Proc. IEEE Conference on Computer Vision and Pattern Recognition (CVPR), 2005, and "*Bayesian Surprise attracts human attention*", which is a paper presented at the Advances in Neural Information Processing Systems (NIPS), 2006, both of which are hereby incorporated by reference as though fully set forth herein.

To compute surprise, $\alpha$ and $\beta$ parameter are computed for the Gamma PDF. This will be done for each frame. Thus, when a new frame is processed, the DoG filtered scores image $S^g$ is used to update the system. Then, when we have updated the system, surprise is computed to get the surprise over how much the model has changed. Any suitable surprise computation can be utilized, a non-limiting example of which includes the Kullback-Leibler divergence, described in "On information and sufficiency", in the *Annals of Mathematical Statistics*, 22, 79-86, 1951, which is hereby incorporated by reference as though fully set forth herein.

Thus, if the new model is very different from the older model, surprise is high. For the first frame, initialize $\alpha$ and $\beta$, as follows:

$$\alpha_j = 0 \tag{8}$$

$$\beta = 1/(1-\lambda) \tag{9}$$

Here, $\lambda$ is a constant decay factor used for forgetting. These values are only initialized on the first frame. However, on every frame, including the first, the update is computed as follows:

$$\alpha'_j \lambda + S_j^g/(\beta_j \cdot \lambda) \tag{10}$$

$$\beta'_j = \beta_j \cdot \lambda + 1 \tag{11}$$

Surprise is then computed as:

$$L_j = -\alpha' + \alpha' \cdot \frac{\beta}{\beta'} + a \cdot \log\left(\frac{\beta'}{\beta}\right) + \log[\Gamma(a')] - \log[\Gamma(a)] + (a' - a) \cdot \Psi(a) \tag{12}$$

Here, $\Gamma$ is the gamma function. See, for example, the definition as provided on Wikipedia (See http://en.wikipedia.org/wiki/Gamma_function, taken Feb. 11, 2014), which is hereby incorporated as though fully set forth herein. This is not to be confused with the gamma PDF. The gamma function acts as a factorial with support for fractional numbers. $\Psi$ is the PolyGamma of the first kind or more typically just called the psi or digamma function. See, for example, the definition as provided on Wikipedia (See http://en.wikipedia.org/wiki/Digamma_function, taken Feb. 11, 2014), which is hereby incorporated as though fully set forth herein.

Once the surprise is computed, the scores image can then be attenuated with the surprise, as follows:

$$S_j^L = \begin{cases} S_j^g \cdot [1 + (L_j 0^{w_s}] & t > 3 \\ S_j^g & \text{else} \end{cases} \tag{13}$$

The attenuation is performed after frame 3 since the first few frames are required to learn $\alpha$ and $\beta$. Here $w_S$ is a constant used to enhance the effects of surprise. Notice that the more surprising a score is, the more it is increased.

(3.3.3) Score Range Conditioning

The final conspicuity score $S_j$ is computed from a difference from the last score and squashed by a hyperbolic tangent, as follows:

$$S_j = \tan h(1000 \cdot |S_j^{L,t} - S_j^{L,t-1}|) \tag{14}$$

This will cause the final conspicuity score to range from 0 to 1. Note that the process subtracts the scores image in the current frame from the scores image in the last frame. This helps to force scores at a location into being unique and not constant. The multiplication by 1000 tends to make the score range from around 0 to 1 which is compatible with the tan h function. The final conspicuity score can be used as a filter, in that conspicuity scores in a portion of the frame that are below a predetermined threshold are filtered out, while conspicuity scores exceeding the threshold allow the relevant portions of the frame to be presented to a user to other identification programs.

All the locations in an image with a conspicuity score above some value are considered interesting. As understood by those skilled in the art, thresholding is the act of creating some sort of arbitrary cut-off value for what is interesting and what is not interesting. The TAN H function forces all scores to range from 0 to 1. So the score threshold is a valid number from 0 to 1. If, for example, the threshold cut-off is set to 1, nothing would be interesting. If, alternatively, the value is set to 0, everything is interesting. Thus, the threshold value is a number between 0 to 1 that provides a desired number of interesting results, a non-limiting example of which includes 0.3.

Thus, in operation, the system is effective in identifying the conspicuity of objects to be detected. In one aspect, the system operates as a filter to a pedestrian identification scheme. In this aspect, the device allows for a pedestrian identification program to concentrate on only parts of the scene which are actively changing and where a person is most likely to be found by filtering out uninteresting parts of the input frame.

What is claimed is:

1. A system for scene change detection, the system comprising:
   one or more processors and a memory, the memory having instructions encoded thereon for causing the one or more processors to perform operations of:
   receiving an input image from a video stream, the input image being a current frame in the video stream;
   color conditioning the input image to generate a color conditioned image;
   using a window to segment the input image into a plurality boxes;
   extracting descriptors from each box of the color conditioned image;
   identifying differences in the descriptors between a current frame and past frames;

attenuating the differences to generate a descriptor attenuation factor $\alpha_i$;

generating initial scores for each box based on the descriptor attenuation factor $\alpha_i$;

filtering the initial scores to generate a set of conspicuity scores for each box, the set of conspicuity scores being reflective of a conspicuity of each box in the image; and presenting to a user or providing for further processing the boxes having conspicuity scores that exceed a predetermined threshold.

2. The system a set forth in claim 1, further comprising an operation of down-sampling the color conditioned image.

3. The system a set forth in claim 2, wherein color conditioning the input image further comprises operations of:

converting the input frame, which is in a red-green-blue (RGB) color space, to a standard hue-saturation-value (HSV) color space;

setting all the pixels in the input frame to have the same constant intensity V; and transforming the input frame back into the RGB color space to generate a color conditioned image.

4. The system as set forth in claim 3, wherein in extracting descriptors from each box of the color conditioned image, a set of descriptors $h_{ij}$ are obtained from each box j, where h denotes a type of descriptor, such that $h_{ij}$ is the ith descriptor in the descriptor set j.

5. The system as set forth in claim 4, wherein identifying differences in the descriptors between a current frame and past frames further comprises operations of:

generating a difference descriptor $d_{ij}$ for the ith descriptor in box j at the current time t going back f number of frames as follows:

$$d_{ij} = \max[(h_{ij}^t - h_{ij}^{t-1}), \ldots, (h_{ij}^t - h_{ij}^{t-f})];$$

and generating a mean difference descriptor $\bar{d}_t$ that contains a mean difference for each descriptor i over all j descriptor set boxes, as follows:

$$\bar{d}_t = \frac{\sum_{j=1}^{n} d_{ij}}{n} \cdot 100.0,$$

where there are n descriptor sets.

6. The system as set forth in claim 5, wherein the descriptor attenuation factor $\alpha_i$ is generated according to the following:

$$\alpha_i = (1 - \bar{d}_t)^{w_\alpha},$$

where $w_\alpha$ is a constant weight.

7. The system as set forth in claim 6, wherein in generating initial scores $p_j$ for each box j based on the descriptor attenuation factor, the initial score is a score p, for each box j, for m descriptors in each box j, such that the initial score $p_j$ is determined according to the following:

$$P_j = \sqrt{\frac{\sum_{i=1}^{m} d_{ij} \cdot a_i}{\sum_{i=1}^{m} a_i}}.$$

8. The system as set forth in claim 7, wherein filtering the initial scores, the scores are filtered consecutively through a Difference of Gaussian (DoG) filter, a Bayesian Surprise attenuation filter, and a score range conditioning filter, resulting the set of conspicuity scores for each box.

9. A computer program product for scene change detection, the computer program product comprising:

a non-transitory computer-readable medium having executable instructions encoded thereon, such that upon execution of the instructions by one or more processors, the one or more processors perform operations of:

receiving an input image from a video stream, the input image being a current frame in the video stream;

color conditioning the input image to generate a color conditioned image;

using a window to segment the input image into a plurality boxes;

extracting descriptors from each box of the color conditioned image;

identifying differences in the descriptors between a current frame and past frames;

attenuating the differences to generate a descriptor attenuation factor $\alpha_i$;

generating initial scores for each box based on the descriptor attenuation factor $\alpha_i$;

filtering the initial scores to generate a set of conspicuity scores for each box, the set of conspicuity scores being reflective of a conspicuity of each box in the image; and presenting to a user or providing for further processing the boxes having conspicuity scores that exceed a predetermined threshold.

10. The computer program product a set forth in claim 9, further comprising an operation of down-sampling the color conditioned image.

11. The computer program product a set forth in claim 10, wherein color conditioning the input image further comprises operations of:

converting the input frame, which is in a red-green-blue (RGB) color space, to a standard hue-saturation-value (HSV) color space;

setting all the pixels in the input frame to have the same constant intensity V; and transforming the input frame back into the RGB color space to generate a color conditioned image.

12. The computer program product as set forth in claim 11, wherein in extracting descriptors from each box of the color conditioned image, a set of descriptors $h_{ij}$ are obtained from each box j, where h denotes a type of descriptor, such that $h_{ij}$ is the ith descriptor in the descriptor set j.

13. The computer program product as set forth in claim 12, wherein identifying differences in the descriptors between a current frame and past frames further comprises operations of:

generating a difference descriptor $d_{ij}$ for the ith descriptor in box j at the current time t going back f number of frames as follows:

$$d_{ij} = \max[(h_{ij}^t - h_{ij}^{t-1}), \ldots, (h_{ij}^t - h_{ij}^{t-f})];$$

and generating a mean difference descriptor $\bar{d}_t$ that contains a mean difference for each descriptor i over all j descriptor set boxes, as follows:

$$\bar{d}_t = \frac{\sum_{j=1}^{n} d_{ij}}{n} \cdot 100.0,$$

where there are n descriptor sets.

14. The computer program product as set forth in claim 13, wherein the descriptor attenuation factor $\alpha_i$ is generated according to the following:

$$\alpha_i = (1-\bar{d}_t)^{w_\alpha},$$

where $w_\alpha$ is a constant weight.

15. The computer program product as set forth in claim 14, wherein in generating initial scores $p_j$ for each box j based on the descriptor attenuation factor, the initial score is a score p, for each box j, for m descriptors in each box j, such that the initial score $p_j$ is determined according to the following:

$$p_j = \sqrt{\frac{\sum_{i=1}^{m} d_{ij} \cdot a_i}{\sum_{i=1}^{m} a_i}}.$$

16. The computer program product as set forth in claim 15, wherein filtering the initial scores, the scores are filtered consecutively through a Difference of Gaussian (DoG) filter, a Bayesian Surprise attenuation filter, and a score range conditioning filter, resulting the set of conspicuity scores for each box.

17. A computer implemented method for scene change detection, the method comprising an act of:
causing one or more processors to execute instructions encoded on a non-transitory computer-readable medium, such that upon execution, the one or more processors perform operations of:
receiving an input image from a video stream, the input image being a current frame in the video stream;
color conditioning the input image to generate a color conditioned image;
using a window to segment the input image into a plurality boxes;
extracting descriptors from each box of the color conditioned image;
identifying differences in the descriptors between a current frame and past frames;
attenuating the differences to generate a descriptor attenuation factor $\alpha_i$;
generating initial scores for each box based on the descriptor attenuation factor $\alpha_i$;
filtering the initial scores to generate a set of conspicuity scores for each box, the set of conspicuity scores being reflective of a conspicuity of each box in the image; and
presenting to a user or providing for further processing the boxes having conspicuity scores that exceed a predetermined threshold.

18. The method a set forth in claim 17, further comprising an operation of down-sampling the color conditioned image.

19. The method a set forth in claim 18, wherein color conditioning the input image further comprises operations of:
converting the input frame, which is in a red-green-blue (RGB) color space, to a standard hue-saturation-value (HSV) color space;
setting all the pixels in the input frame to have the same constant intensity V; and
transforming the input frame back into the RGB color space to generate a color conditioned image.

20. The method as set forth in claim 19, wherein in extracting descriptors from each box of the color conditioned image, a set of descriptors $h_{ij}$ are obtained from each box j, where h denotes a type of descriptor, such that $h_{ij}$ is the ith descriptor in the descriptor set j.

21. The method as set forth in claim 20, wherein identifying differences in the descriptors between a current frame and past frames further comprises operations of:
generating a difference descriptor $d_{ij}$ for the ith descriptor in box j at the current time t going back f number of frames as follows:

$$d_{ij} = \max[(h_{ij}^t - h_{ij}^{t-1}), \ldots, (h_{ij}^t - h_{ij}^{t-f})]; \text{ and}$$

generating a mean difference descriptor d, that contains a mean difference for each descriptor i over all j descriptor set boxes, as follows:

$$\bar{d}_t = \frac{\sum_{j=1}^{n} d_{ij}}{n} \cdot 100.0,$$

where there are n descriptor sets.

22. The method as set forth in claim 21, wherein the descriptor attenuation factor $\alpha_i$ is generated according to the following:

$$\alpha_i = (1-\bar{d}_t)^{w_\alpha},$$

where $w_\alpha$ is a constant weight.

23. The method as set forth in claim 22, wherein in generating initial scores $p_j$ for each box j based on the descriptor attenuation factor, the initial score is a score p, for each box j, for m descriptors in each box j, such that the initial score $p_j$ is determined according to the following:

$$p_j = \sqrt{\frac{\sum_{i=1}^{m} d_{ij} \cdot a_i}{\sum_{i=1}^{m} a_i}}.$$

24. The method as set forth in claim 23, wherein filtering the initial scores, the scores are filtered consecutively through a Difference of Gaussian (DoG) filter, a Bayesian Surprise attenuation filter, and a score range conditioning filter, resulting the set of conspicuity scores for each box.

* * * * *